United States Patent [19]

Sonoda et al.

[11] Patent Number: 4,482,850
[45] Date of Patent: Nov. 13, 1984

[54] CONTROL CIRCUIT FOR DC CAPSTAN MOTOR

[75] Inventors: Masakazu Sonoda; Takashi Terajima, both of Urawa; Minoru Ozawa, Kokubunji, all of Japan

[73] Assignee: Sony Corporation, Tokyo, Japan

[21] Appl. No.: 422,566

[22] Filed: Sep. 24, 1982

[30] Foreign Application Priority Data

Sep. 25, 1981 [JP] Japan .................................. 56-151635

[51] Int. Cl.³ .............................................. H02P 3/10
[52] U.S. Cl. .................................... 318/606; 318/265; 318/341; 318/327
[58] Field of Search ............... 318/341, 327, 255, 256, 318/257, 258, 261, 264, 265, 268, 269, 606

[56] References Cited

U.S. PATENT DOCUMENTS

| 3,465,228 | 9/1969 | Long et al. | 318/341 X |
| 3,487,458 | 12/1969 | Martens et al. | 318/606 X |
| 3,766,497 | 10/1973 | Opal et al. | 318/341 X |
| 4,155,033 | 5/1979 | DeBell et al. | 318/341 |
| 4,177,412 | 12/1979 | Minakuchi | 318/341 |
| 4,211,964 | 7/1980 | Yabu et al. | 318/327 X |
| 4,323,832 | 4/1982 | Okamura | 318/341 |

FOREIGN PATENT DOCUMENTS

| 0031879 | 3/1979 | Japan | 318/256 |
| 2081533 | 2/1982 | United Kingdom | 318/269 |
| 2083304 | 3/1982 | United Kingdom | 318/269 |

Primary Examiner—J. V. Truhe
Assistant Examiner—Bentsu Ro
Attorney, Agent, or Firm—Lewis H. Eslinger; Alvin Sinderbrand

[57] ABSTRACT

A control circuit is used during slow or stop-motion playback operation of a video tape device to drive video tape intermittently. In order to avoid errors in the stopping position of the tape, a pulse width modulated (PWM) signal is provided to a motor controller circuit associated with the capstan motor of the video tape device. A frequency signal generator coupled to this motor generates a frequency signal that varies with the capstan motor speed, and this frequency signal is provided to a retrigger monostable multivibrator which generates a PWM signal whose duty ratio changes in proportion to the capstan motor speed. A drive pulse generator and a brake pulse generator provide drive start and brake start signals, respectively, when it is desired to commence and stop movement of the tape. A drive circuit, including the retrigger monostable multivibrator, receives the drive start signal, the brake start signal, and the frequency signal to generate the PWM signal which is supplied to the motor controller circuit. The frequency signal is selected to have a pulse rate several tens of times the ripple frequency of the motor's torque ripple characteristic so that inaccuracies in stopping position of the motor are eliminated.

14 Claims, 35 Drawing Figures

FIG.5D  Q'
FIG.5E  PWM

CONTROL CIRCUIT FOR DC CAPSTAN MOTOR

BACKGROUND OF THE INVENTION

This invention relates to control circuitry for DC motors, and is more particularly directed to a control circuit for a capstan motor of a tape recording and/or reproducing device, especially a control circuit of a type supplying pulse-width modulated drive signals to the motor to drive the tape intermittently.

In video recorders, particularly video tape devices in which fields of video information are recorded on successive slant tracks on the tape, it is often useful to drive the tape intermittently so that different slant tracks can be repeatedly scanned, such as in slow-motion or still-frame reproduction. This is particularly useful, for example, when editing a video program recorded on tape.

On video tape, control signals are typically recorded in a longitudinal control track along an edge of the tape to indicate the position of respective associated slant tracks. That is, the control signals are situated in predetermined locations on the tape relative to the location of the slant tracks. Accordingly, the control signals, which are detected by a stationary control head as the tape is drawn past it, can be used to control stopping of the capstan during intermittent operation and to stop the tape at the location of a desired slant track. This ensures that the trace of a rotary head, carried on a rotating head wheel or drum for picking up the video signal, coincides accurately with the track. It is desirable that this be true for intermittent operation in both the forward and the reverse direction of transport of the tape.

A conventional capstan motor control circuit generates a drive pulse to effect intermittent motion of the capstan motor. This drive pulse commences (rises to high level) at the time a start signal is received and then ceases (drops to low level) at a later time estimated to correspond with the advancement of the tape by one slant track. A braking pulse occurs when the control signal for a desired track is detected, and is used to halt rotation of the capstan motor. This pulse has a width calculated be sufficient to stop the motor, but short enough not to cause reverse rotation thereof.

This conventional control circuit has not been capable of accurately halting the tape at the positions of the recorded slant video tracks. One reason for this is that the DC capstan motor has a torque ripple associated with it, typically 24 waves per rotation. Moreover, starting torque is typically much higher than output torque at normal capstan speed, so torque ripple at the time the appropriate control signal is detected (and the braking pulse is generated) pulse is further exaggerated, and results in unacceptable errors in the stopping position of the tape.

Because the torque ripple is typically 24 waves per rotation, it is desirable to control the motor with a signal that can vary at much smaller intervals, i.e., several tens of times the frequency of the torque ripple. Unfortunately, conventional intermittent drive control circuits have not been able to provide such a drive signal.

OBJECTS AND SUMMARY OF THE INVENTION

Accordingly, it is an object of this invention to provide a control circuit for a DC motor avoiding the drawbacks of the prior art.

It is another object of this invention to provide a control circuit for a DC motor permitting accurate stopping of the motor at a desired location notwithstanding torque ripple in the motor.

It is a more specific object of this invention to provide a control circuit for a DC capstan motor which is to be operated intermittently to advance video tape, ensuring that the tape is accurately halted at positions in which video signals recorded in slant tracks thereon can be reproduced.

According to an aspect of this invention, a control circuit for a DC capstan motor for driving a tape in a tape device, such as a video tape recorder (VTR), video tape player, or video tape editing arrangement, supplies drive current to the motor so as to drive the tape intermittently. In this control circuit a frequency signal generator associated with the capstan motor generates a frequency signal with a frequency that varies with rotational speed of the motor, for example, by a factor of 720 times the rotary frequency of the motor. A drive pulse generator circuit generates a drive pulse signal when it is desired to commence driving of the tape. A brake pulse generator circuit generates a brake pulse signal when it is desired to stop the driving of the tape. A drive circuit supplied with the frequency signal, the drive pulse signal, and the brake pulse signal generates a pulse-width modulated (PWM) signal whose duty ratio changes with the frequency of the frequency signal, and hence with the motor's rotational speed, such that during the drive pulse signal the duty ratio decreases with increasing rotational speed and during the brake pulse signal the duty ratio decreases with decreasing rotational speed. A motor controller circuit supplied with this PWM signal supplies drive current to the motor. This arrangement ensures that, during intermittent operation, the capstan motor will cause the tape to advance and halt in such a manner that the tape is halted accurately, for example, at the location of a track of recorded video information, despite any inaccuracies due to the motor's torque characteristic.

The above and other objects, features, and advantages of this invention will become more fully apparent from the ensuing description of a preferred embodiment, when considered in connection with the accompanying drawings.

DETAILED DESCRIPTION OF A PREFERRED EMBODIMENT

With reference to the drawings, and initially to FIGS. 1 and 2A-2F thereof, a prior-art control circuit will be initially described to underscore the advantages of the control circuit of this invention.

As mentioned earlier, in order to permit a video tape recording and/or reproducing device to be operated in a non-standard speed mode, such as stop motion or slow motion, an intermittent-speed control circuit is employed to drive the device's capstan motor intermittently. For example if slow speed reproduction is desired, the capstan should advance the tape repeatedly, by alternately running and stopping the tape. Because the recorded tracks of video information on the tape will correspond to the positions of control signals recorded on the edge of the tape, the intermittent-speed control circuit can be operated under control of detected control signals to cause the capstan to run the tape at standard speed for one pitch of the control signal.

While not specifically shown in the drawings, a video tape recorder (VTR) can have a pair of rotary magnetic heads $H_a$ and $H_b$, disposed 180 degrees apart for alternately scanning successive tracks on the tape when the tape is played at normal speed. These heads $H_a$ and $H_b$ can be provided with different azimuth angles. A supplementary rotary magnetic head $H_a'$, which has the same azimuth angle as the head $H_a$, is angularly displaced from the magnetic head $H_b$ by an angular distance corresponding to 1.25 H, where H is the period of a horizontal scanning interval. If a single track is repeatedly scanned, the magnetic heads $H_a$ and $H_a'$ are used. However, for slow-speed operation, for example at 1/N of standard speed (where N is an integer), a single field on the magnetic tape can be reproduced for (N−1) frames with the tape held stationary, after which the next two fields or tracks are reproduced by using the magnetic heads $H_a$ and $H_b$ for one frame period while the tape is moved at standard speed. By carrying out the above steps repeatedly, the video signal recorded on the tape is reproduced at the speed of 1/N of standard speed.

Figure 1:
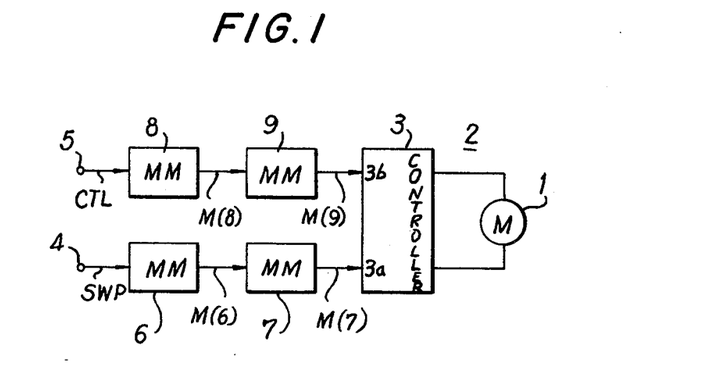
FIG. 1 is a schematic view of a DC motor control circuit according to the prior art.
Figure 2A:
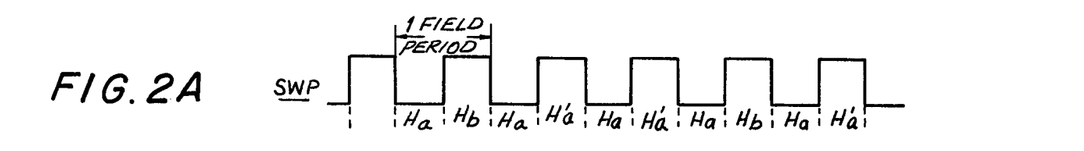
FIGS. 2A to 2F are waveform charts for explaining the operation of the control circuit of FIG. 1.
Figure 2B:
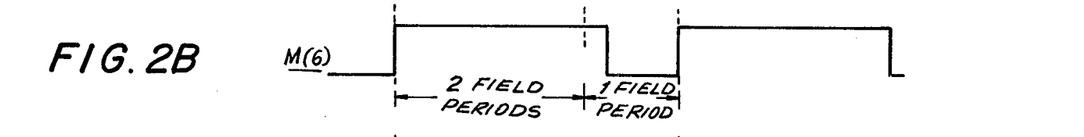
Figure 2C:
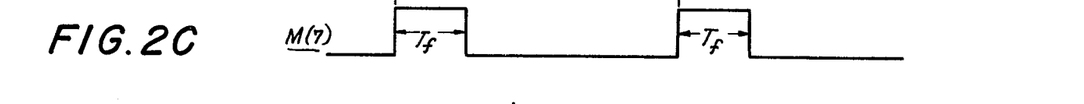

FIG. 1 shows a control circuit for driving the tape capstan of the VTR to advance the magnetic tape intermittently as described above. In this circuit, a DC motor 1 is coupled to the tape capstan (not shown) for direct drive of the latter. A drive control circuit 2 is coupled to the motor 1 for intermittent advancing of the tape. A motor controller circuit 3 has outputs coupled to drive the motor 1, and inputs 3a and 3b to receive signals for controlling the driving and rotation direction of the motor 1, respectively. A switch pulse input 4 receives a head change-over signal or switching pulse SWP (FIG. 2A) which rises when the reproducing device is switched over from magnetic head $H_a$ to one of the other heads $H_a'$ or $H_b$, and which falls at the time that the device switches back to the magnetic head $H_a$. A control pulse input 5 is coupled to receive control pulses CTL which are picked up from the control track of the magnetic tape. A monostable multivibrator 6 is triggered at the falling of the change-over signal SWP and provides an output signal M(6) (FIG. 2B). A time constant of this monostable multivibrator 6 can be varied in accordance with the desired tape speed to correspond with the above-mentioned integer N. In this example, since N=3, the time constant is determined so that the width of the output pulse M(6) is greater than two frame periods, but no more than three frame periods.

This pulse M(6) is applied to another monostable multivibrator 7, which, in turn provides a drive pulse M(7) (FIG. 2C) to the terminal 3a of the controller 3. This pulse M(7) rises at the leading edge of the pulse M(6) and has a pulse width $T_f$. This pulse M(7) causes the controller 3 to apply a DC voltage to the motor 1 to cause it to advance the tape in the forward direction. The pulse width $T_f$ here is determined to be not greater than one frame period.

Figures 2D, 2E:
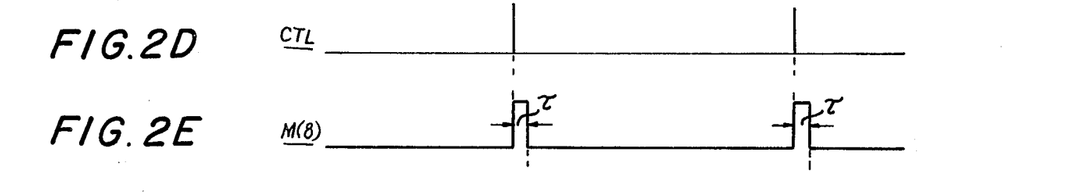
Figure 2F:
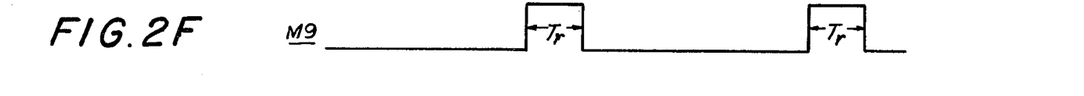

The control pulse CTL, which is shown in FIG. 2D, picked up by a stationary control head (not shown) from the control track on the tape, is applied as a trigger to another monostable multivibrator 8, which then provides an output trigger pulse M(8) (FIG. 2E). This pulse M(8) has a duration which can be adjusted, for example by adjusting the setting of a tracking potentiometer (not shown) to achieve accurate tracking during intermittent operation. This pulse M(8) is applied to a further monostable multivibrator 9, which in turn provides a breaking pulse M(9) (FIG. 2F). This pulse M(9) rises at the time that the pulse M(8) falls, and has a duration $T_r$. This output pulse M(9) is applied to the terminal 3b of the controller 3 so that current is caused to flow in a reverse direction through the motor 1. This pulse duration $T_r$ is selected to be long enough to cause the current to brake the capstan motor 1, so that tape comes to a complete stop, but not so long that the motor 1 would begin to rotate in the reverse direction.

If it is intended to run the capstan motor 1 at a variety of running speeds, the multivibrators 7 and 9 can be provided with a plurality of predetermined settings, and the durations $T_f$ and $T_r$ of the pulses M(7) and M(9) can be changed to correspond with each of the various running speeds.

With the prior-art control circuit described hereinabove, because the running speed and the stopping of the tape are carried out by supplying pulses of constant duration to the DC motor 1, the stopping position of the tape cannot be accurately determined. This disadvantage occurs because of uncertainties due to torque change, torque ripple, load change, and other factors which can vary when the rotation speed of the motor 1 is changed. Of course, any error in the stopping position of the tape will be accompanied by a mismatch in the trace position of the scanning magnetic heads $H_a$ and $H_a'$ with respect to the video track to be scanned, with a concomitant reduction in picture signal quality.

The foregoing problem can be avoided by employing a pulse width modulated (PWM) signal for running and braking the DC motor 1.

Figure 3:
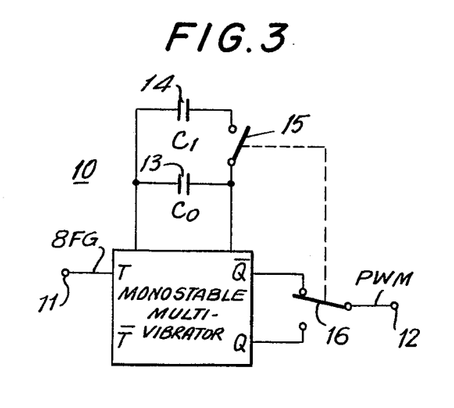
FIG. 3 is a schematic circuit diagram of a retrigger monostable multivibrator forming a portion of one embodiment of the control circuit according to this invention.

FIG. 3 illustrates a retrigger mono-stable multivibrator 10 which can be employed in embodiments of this invention to generate an appropriate PWM signal to control the motor 1 during intermittent operation. This monostable multivibrator 10 has a trigger input 11 to which a frequency signal 8FG can be applied and an output terminal 12 supplying the PWM signal. A pair of timing capacitors 13 and 14 are coupled to the multivibrator 10 with a switch 15 being employed to selectively connect the capacitor 14. These capacitors 13 and 14 have respective capacitances of $C_0$ and $C_1$. Another switch 16 ganged with the switch 15 selectively connects the output 12 to an uninverted output Q and to an inverted output $\overline{Q}$ of the multivibrator 10 when the switch 15 is closed and open, respectively.

When the switch 15 is opened, the multivibrator 10 has a pulse duration $\tau_0$ determined by the capacitance $C_0$ alone. When the switch 15 is closed, the multivibrator 10 has a longer pulse duration $\tau_1$ determined by the sum of the capacitances $C_0$ and $C_1$. Here the capacitances $C_0$ and $C_1$ are chosen so that $\tau_1 = 1.5\tau_0$.

The frequency signal 8FG has a frequency which is proportional to the angular speed $\Omega_c$ of the motor 1. Thus, the duty ratio of the uninverted output Q of the multivibrator 10 (with the switch 15 open) will be equal to the ratio of the pulse duration $\tau_0$ to the period of the frequency signal 8FG. As shown in the solid line in FIG. 4, this duty ratio increases in proportion to the rotational angular speed $\Omega_c$ of the capstan motor 1 from a duty ratio of zero at an angular speed of zero to a duty ratio of unity at a normal running speed $\Omega_0$. Conversely, the duty ratio of the inverted output signal $\overline{Q}$ decreases in proportion to the angular speed $\Omega_c$ from a duty ratio of unity at zero rotational speed to a duty ratio of zero at the angular speed $\Omega_0$.

Figure 4:
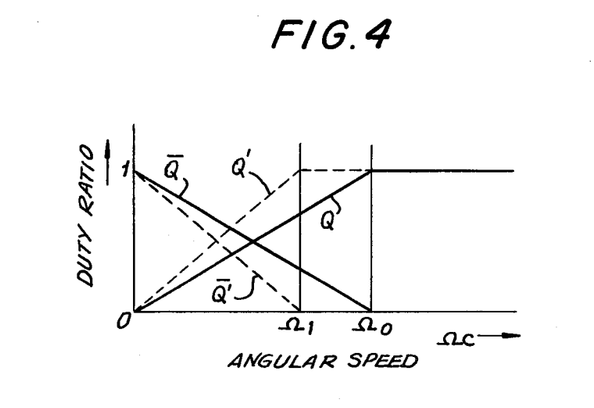
FIG. 4 is a chart showing the relation of duty ratio to motor speed for a pulse-width modulated (PWM) output generated by the retrigger monostable multivibrator of FIG. 3.

When the switch 15 is closed, the monostable multivibrator 10 will provide its uninverted output signal Q' (the prime indicating that the time constant is $\tau_1$ instead of $\tau_0$, as shown by dash line in FIG. 4) with a duty ratio that rises from zero at zero rotational motor speed to unity at a rotational speed $\Omega_1$, which is less than the angular speed $\Omega_0$. Conversely, during the time that the switch 15 is open, the inverted output $\overline{Q}'$ will vary inversely with motor speed as also shown by dash line in FIG. 4.

Figure 5A:
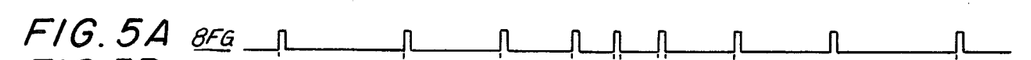
FIGS. 5A to 5E are waveform charts for explaining operation of the retrigger monostable multivibrator of FIG. 3.
Figures 5B, 5C:
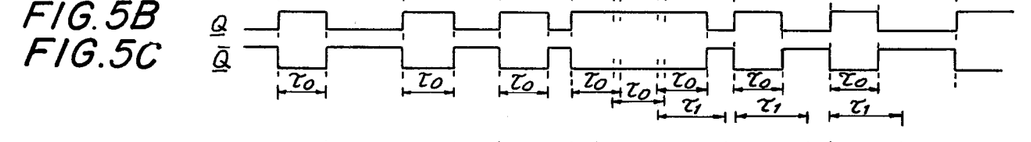
Figure 5D:
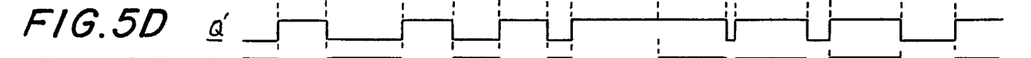
Figure 5E:
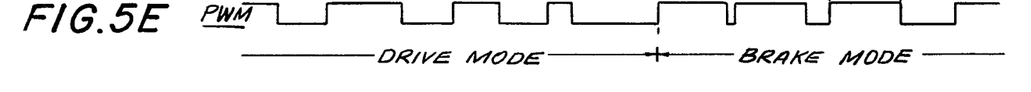

FIGS. 5A to 5E show the generation of the PWM signal from the retrigger monostable multivibrator 10. As shown in FIG. 5A, the frequency signal 8FG has a pulse frequency which varies in proportion to the capstan motor rotational speed $\Omega_c$. Correspondingly, the period of this signal 8FG decreases during a drive mode, and increases during a brake mode. As shown in FIGS. 5B and 5C, the uninverted and inverted outputs Q and $\overline{Q}$, which rise and fall respectively with the leading edge of the signal 8FG, fall and rise, respectively, at a time $\tau_0$ thereafter. At speeds at or exceeding $\Omega_0$, these outputs are continuously on and off, respectively. However, if the pulse duration is changed to $\tau_1$ when a in the brake mode is selected, for example, by closing the switch 15, the uninverted output Q' will appear as shown in FIG. 5D. Also, because the switch 16 is ganged with the switch 15, a signal PWM will appear at the output 12, as shown in FIG. 5E. This signal PWM is fed to the controller circuit 3 to drive the DC motor 1.

Because the capstan motor 1 is driven by the inverted output $\overline{Q}$ which decreases with increasing motor speed, a speed servo loop is formed with an average angular speed $\Omega_c$ for the capstan as given by the following equation.

$$\Omega_c = (1 - T_L/T_M) \cdot \Omega_0 \quad (1)$$

where $T_L$ is the load torque on the capstan motor 1 (e.g., 15–30 gram-centimeters), and $T_M$ is the start-up torque for the motor 1 (e.g., approximately 550 gram-centimeters). If it is assumed that the start-up torque for the capstan motor 1 is $T_M$, the average load torque is $T_L$, and the average duty ratio of the drive pulse for the motor is $\alpha$, then, when the speed servo loop is in its steady or normal state, the input torque for the capstan motor is equal to the output torque as given by the following equation.

$$\alpha \cdot T_M = T_L \quad (2)$$

On the other hand, considering the above-described principle of generating the drive pulse signal PMW, the relation between the duty ratio $\alpha$ and the pulse period $\Omega_c$ (i.e., the inverse of the frequency) of the frequency signal 8FG becomes:

$$\alpha = (\tau_c - \tau_0)/\tau_c \quad (3)$$
$$= 1 - \Omega_c/\Omega_0$$

Equation (3) can be readily derived from equations (1) and (2).

In any practical DC capstan motor, there are variations in the rotational speed of the frequency generator used in generating the signal 8FG, as well as torque ripple in the motor 1 and variations in the load thereto. Also, there are delays in the circuitry for controlling the motor speed. In fact, the angular speed $\Omega_C$ of the capstan motor generally has some ripple associated with it to cause variations in the speed from the ideal speed shown in equation (1).

Therefore, the start-up torque $T_M$ of equation (1) is normally significantly greater than the average load torque $T_L$, and it can be assumed that the average angular speed $\Omega_C$ is nearly equal to the predetermined angular speed $\Omega_0$. The pitch, or period of the frequency signal 8FG has to be significantly smaller than any undesired fluctuations which are to be eliminated, such as those due to torque ripple. Because torque ripple in a DC capstan motor typically has twenty-four waves per rotation, it is desirable that the frequency signal 8FG have several dozens of that number of occurrences per rotation, and, in the preferred embodiment of this invention, the signal 8FG is provided at 720 pulses per rotation.

If rotation of the capstan motor 1 is commenced by using the above-described speed servo loop, the drive characteristic of the motor 1 has a greatly enhanced stability, but the start-up time is increased. For this reason, in any practical arrangement, it is preferred that the initial portion of the driving current to the motor be provided with a one-hundred-percent duty ratio.

Furthermore, if the rotating capstan motor 1 is braked by using the PWM signal derived from the non-inverting output Q of the multivibrator 10, the braking torque on the motor 1 will be substantially proportional to the angular speed $\Omega_C$ of the motor until the capstan stops, as shown in the solid line in FIG. 4. Consequently, slowdown of the capstan changes geometrically as the angular speed $\Omega_C$ approaches zero. Because, using the above-described PWM signal as a braking signal, almost the entire braking period is in the region having a low duty ratio, the braking time becomes significantly longer. However, the braking can be shortened significantly by causing the switch 15 to select the shorter pulse period $\tau_1$ as the pulse duration time for the monostable multivibrator 10. This permits the duty ratio of the braking pulse to follow the dash line Q' of FIG. 4, thereby shortening the brake time. Moreover, to achieve optimum results, the ratio of $\Omega_1$ to $\Omega_0$ is selected to be approximately two-thirds. This corresponds to the selection of the pulse times $\tau_1$ and $\tau_0$ in the ratio of two-thirds, as described above.

Figure 6:
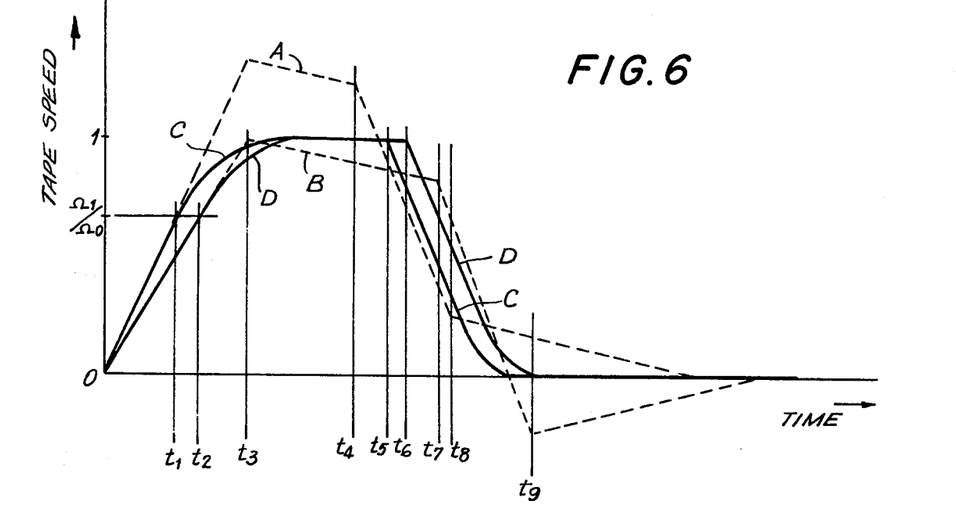
FIGS. 6 and 7 are charts for explaining the advantage of the present invention over the control circuit of the prior art.
Figure 7:
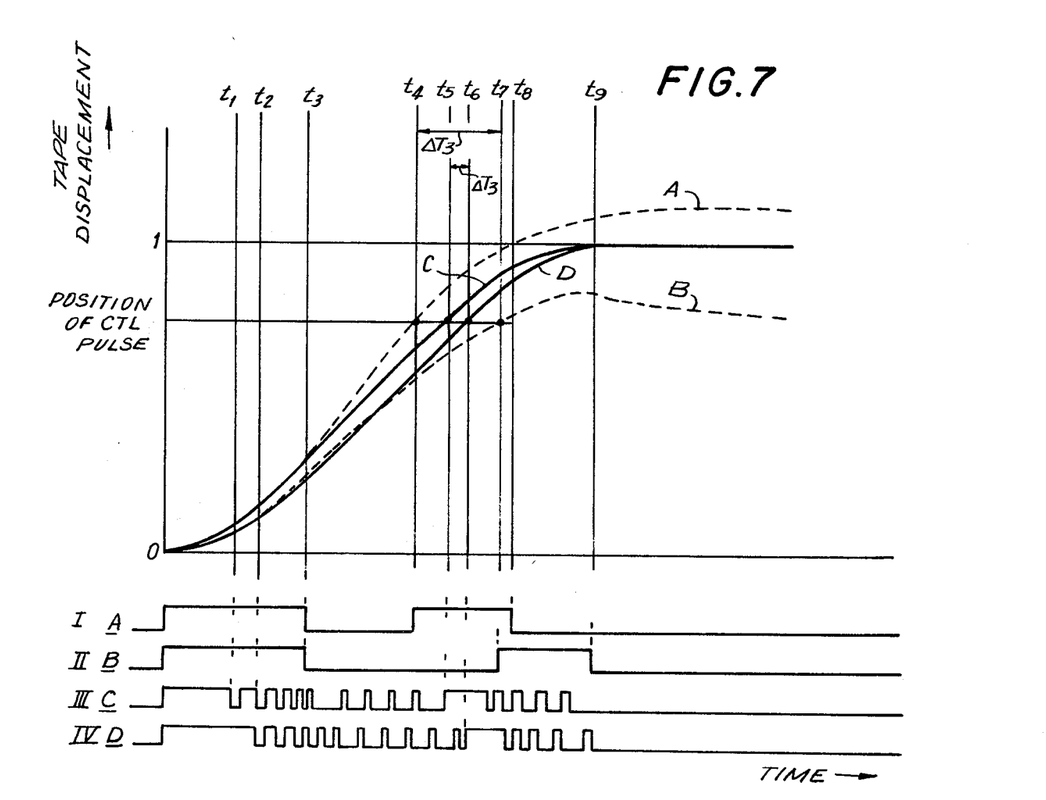

The improved results of PWM-controlled intermittent tape advancement over the pulse driven tape advancement of the prior art can be seen with reference to FIG. 6 and 7. In FIGS. 6 and 7, the abscissas are the time axis. FIG. 6 depicts the tape speed as a function of time, and FIG. 7 depicts the tape displacement as a function of time. Standard tape speed $\Omega_0$ is normalized to unity in FIG. 6, and the ratio of $\Omega_1$ to $\Omega_0$ (i.e., approximately $\frac{2}{3}$) is indicated by a horizontal line. In FIG. 7, the position at which the control pulse CTL is detected is also shown by a horizontal line. Drive pulse and brake pulse signals A and B according to the prior art are shown respectively in waveforms I and II at the bottom portion of FIG. 7, while drive and brake PWM waveforms C and D are shown, respectively in III and IV of FIG. 7. In each case, because of torque ripple, the curves A and C in FIGS. 6 and 7 are driven at peaks in the torque ripple characteristic of the motor and are braked by valleys or troughs in the torque ripple characteristic. On the other hand, the curves B and D are driven by the valleys in the torque ripple characteristic and are braked by the peaks thereof. It should be noted that the curves A and B illustrating the prior-art speed characteristics diverge widely from one another, while the curves C and D illustrating the characteristics using the PWM technique of this invention have only a small variation between one another. Moreover, it is apparent from the prior art tape displacement characteristics A and B of FIG. 7 that there is a significant amount of error in the stopping position of the tape using the prior-art approach for intermittent driving of the tape. However, curves C and D of FIG. 7 illustrate that when the present invention is employed, tape displacement errors disappear.

Figure 8:
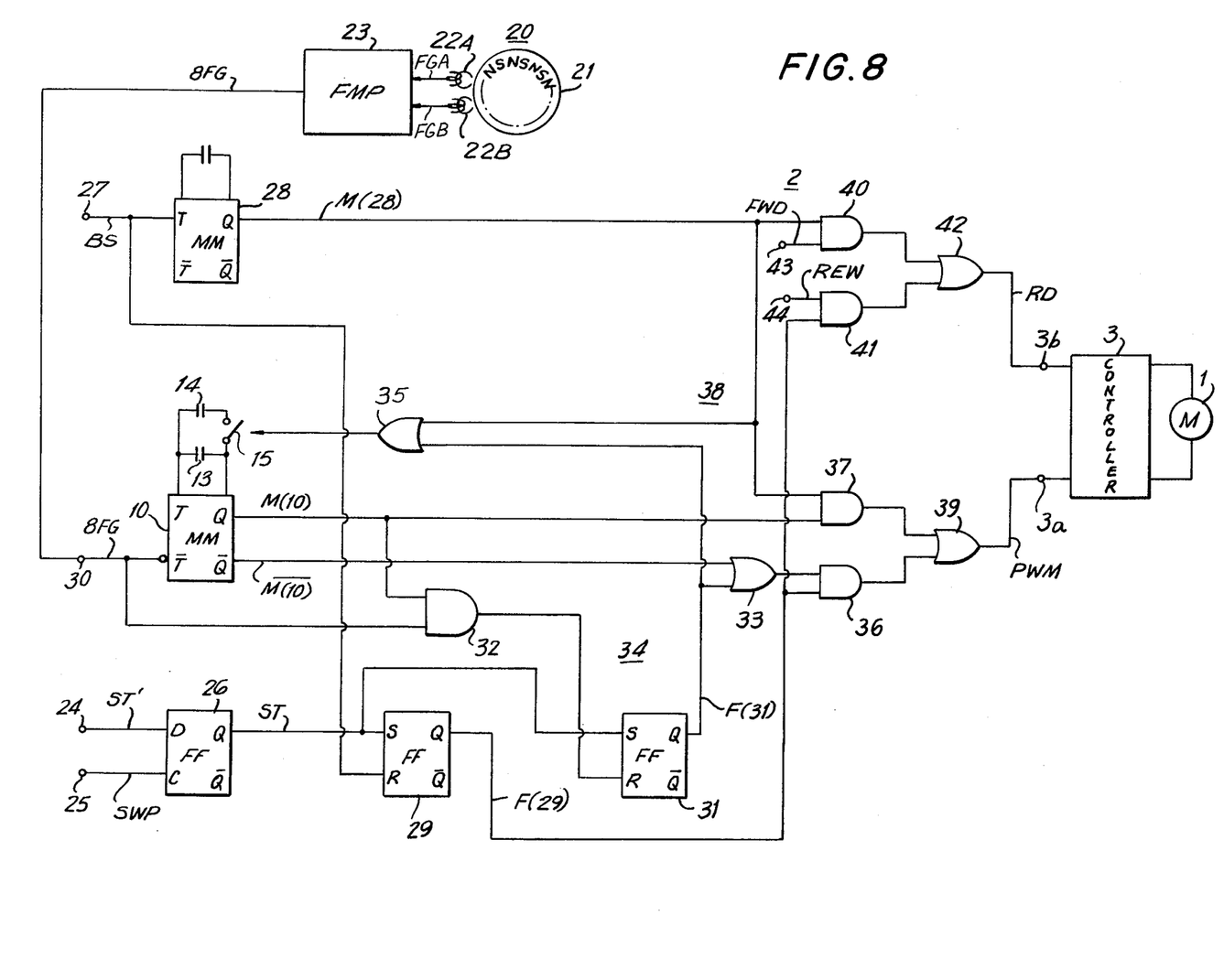
FIG. 8 is a schematic circuit diagram of the preferred embodiment of this invention.

FIG. 8 illustrates a preferred embodiment of the control circuit according to the present invention. This control circuit employs the retrigger monostable multivibrator 10 to provide the PWM signal to the controller 3 to control the speed of the DC capstan motor 1 during intermittent operation. In this embodiment, the DC motor 1 is direct-coupled to a capstan in a VTR in the same fashion as the motor 1 of FIG. 1. Here, the rotational speed of the capstan can be, for example, 2 Hz at standard-speed running. During slow-speed reproduction, the capstan is driven in step fashion by the motor 1.

In this embodiment, a frequency generator 20 comprises a magnetic plate 21 having ninety pairs of magnetic north and south poles N, S disposed alternately thereon. This plate 21 rotates with the capstan motor 1. A pair of magnetic-flux responsive stationary magnetic heads 22A and 22B, which can be magnetoresistive elements, hall elements, or other equivalent devices, are disposed in proximity to the plate 21 to generate sinusoidal signals FGA and FGB, respectively, which differ in phase from one another by ninety degrees. In other words, if it is assumed that the distance between these two heads is $L_h$, and the pitch between successive magnetic poles N and S is $L_m$, then the distance between heads $L_h$ can be expressed as $$L_h = (n + \tfrac{1}{4})L_m; \quad (n = 0, 1, 2, \ldots).$$

These signals FGA and FGB are supplied to a frequency multiplier circuit 23, which generates the frequency signal 8FG at a pulse rate eight times the frequency of either signal FGA or FGB. The details of this frequency multiplier circuit are described later with reference to FIG. 10.

Figure 9A:
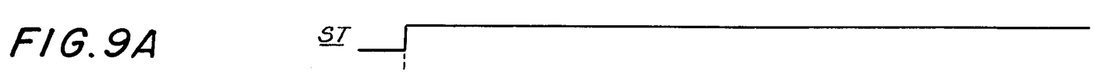
FIGS. 9A to 9I are waveform diagrams for explaining the operation of the embodiment of FIG. 8.

In this embodiment, a start signal input 24 and a switch pulse input 25 are provided to receive, respectively, an external start pulse ST' and the head changeover signal SWP. These signals are respectively applied to data and clock terminals of a flip-flop 26 which provides a synchronized start signal ST (FIG. 9A) from an uninverted output terminal Q thereof.

Figure 9B:
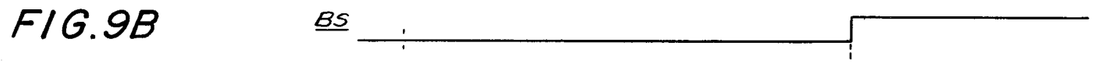
Figure 9C:
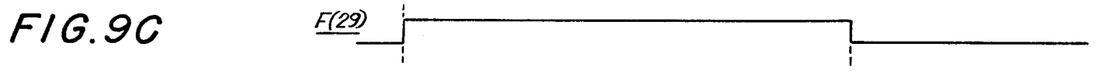
Figure 9D:
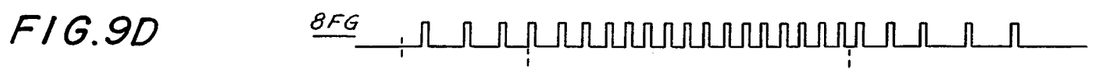
Figure 9E:
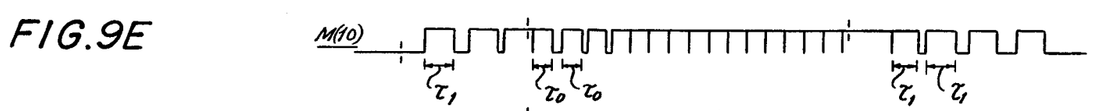

A brake signal input 27 receives an external brake start signal BS (FIG. 9B) and is coupled to a trigger input of a monostable multivibrator 28. Another flip-flop 29 has a set terminal coupled to receive the start signal ST and a reset terminal coupled to receive the brake start signal BS, thereby providing an output signal F(29) (FIG. 9C). A trigger input 30 receives the frequency signal 8FG (FIG. 9D) and applies the same to the retrigger monostable multivibrator 10, which is configured substantially as described above with reference to FIG. 3. This retrigger monostable multivibrator 10 provides a pulse signal M(10) (FIG. 9E) from its uninverted output terminal Q, and an inverted version thereof $\overline{M0)/}$ from its inverted output terminal $\overline{Q}$.

Figure 9F:
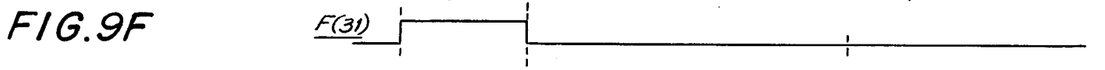

Another flip-flop 31 has a set terminal thereof coupled to receive the start signal ST. An AND gate 32 has inputs coupled to receive the signal M(10) and the frequency signal 8FG, and an output terminal coupled to a reset terminal of the flip-flop 31. Thus, the flip-flop 31 provides from its uninverted output terminal Q an output signal F(31) (FIG. 9F), which rises in response to the start signal ST and falls when the pulses of the signal M(10) overlap the pulses of the frequency signal 8FG. In other words, the signal F(31) is high from the onset of the start signal ST only until the pulse duration $\tau_1$ of the signal M(10) equals or exceeds the period of the frequency signal 8FG, that is, only until the angular speed of the DC capstan motor 1 reaches its predetermined speed $\Omega_1$. The inverted signal $\overline{M0)/}$ and the signal F(31) are each applied to inputs of an OR gate 33.

It should be appreciated that the retrigger monostable multivibrator 10, the AND gate 32, and the flip-flop 31 form a first control loop 34 to control the opening and closing of the switch 15 associated with the multivibrator 10. The signal F(31) is furnished through an OR gate (35) to the switch 15 to change the pulse duration of the signal M(10) from $\tau_1$ to $\tau_0$ after an initial start up period.

Figure 9G:
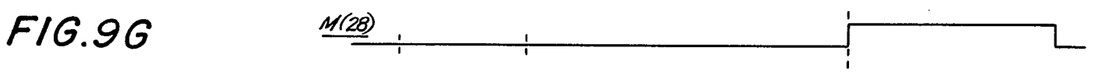

The signals $\overline{F1)/}$ and $\overline{M0)/}$ are supplied from an output of the OR gate 33 to one input of an AND gate 36, another input of which is coupled to receive the signal F(29) from the flip-flop 29. Another AND gate 37 has one input coupled to receive the signal M(10) and another input coupled to an output terminal of the flip-flop 28. The output of this flip-flop 28 is also provided to another input terminal of the OR gate 35. The flip-flop 28 provides a braking signal M(28) (FIG. 9G) for a predetermined period following onset of the brake start signal BS.

It should be appreciated that the flip-flop 28 and the OR gate 35 combine to form a second control loop circuit 38 to close the switch 15 to change the pulse duration of the signal M(10) to $\tau_1$ during braking.

Figure 9H:
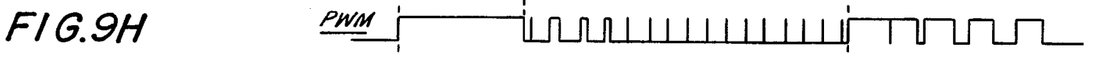

The outputs of the AND gates 36 and 37 are coupled to respective inputs of an OR gate 39, whose output provides the pulse width modulated signal PWM (FIG.

Figure 9I:
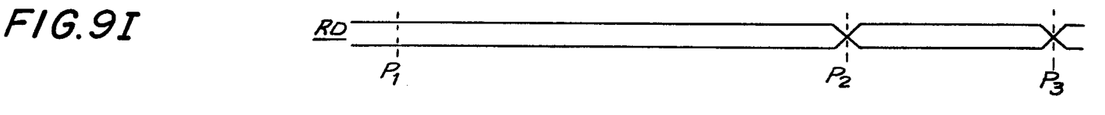

9H) which is applied to the input terminal 3a of the controller 3. The signal M(28) is also applied to one input of an AND gate 40, while the signal F(29) is applied to one input of another AND gate 41. These AND gates 40 and 41 have outputs coupled to inputs of an OR gate 42, whose output is connected to the input terminal 3b of the controller 3. Direction control inputs 43 and 44 connected to other inputs of the AND gates 40 and 41, respectively, receive forward and reverse direction control signals FWD and REV. These signals FWD and REV are respectively high and low when a forward drive mode is selected for the VTR, and are respectively low and high when a reverse drive mode is selected. Consequently, the OR gate 42 provides a rotational direction signal RD (FIG. 9I) which, in a forward mode, goes from high to low at a point P$_2$ corresponding to the onset of the brake start signal BS, and then reverts to high level at a point P$_3$ following the end of the pulse signal M(28). On the other hand, if a reverse mode is selected, the signal RD goes from a low value to a high value at the point P$_2$ and then reverts to a low value at the point P$_3$. Thus, when the tape is run intermittently in the forward direction, the rotation direction switching signal RD becomes high when the motor 1 is to be driven to advance the tape, and low when the motor is to be braked. When the tape is run intermittently in a reverse direction, the switching signal RD becomes low when the motor 1 is to be driven in the reverse direction, and high when the motor is to be braked.

Figure 10:
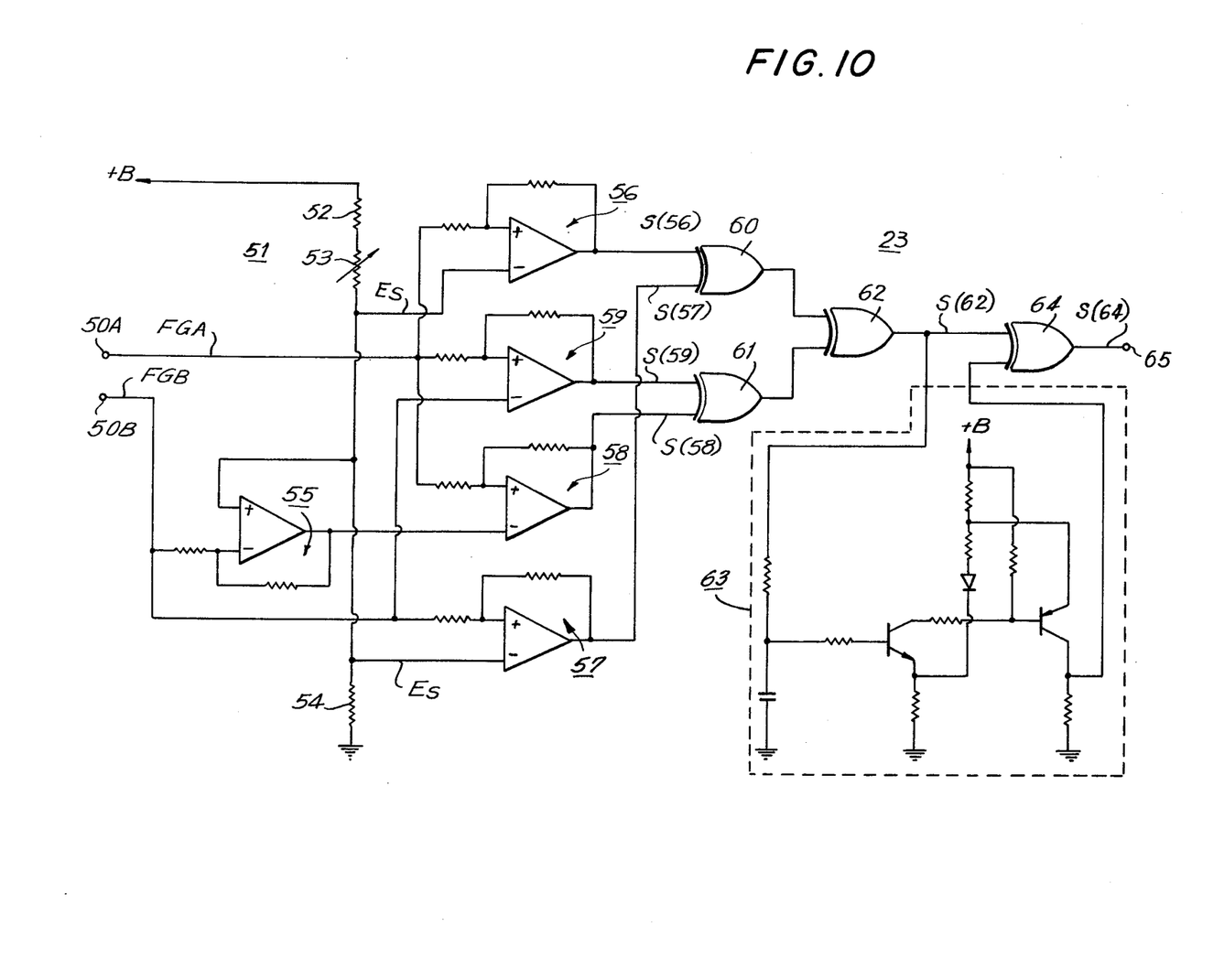
FIG. 10 is a circuit diagram showing a circuit construction of a frequency multiplier circuit employed in the embodiment of FIG. 8.

FIG. 10 shows one possible configuration of the frequency multiplying circuit 23 employed in the embodiment in FIG. 8.

Figure 11A:
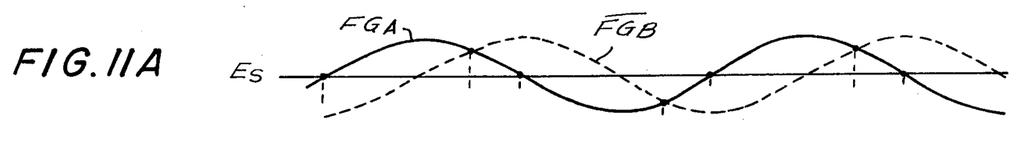
FIGS. 11A to 11H are waveform charts for explaining the operation of the frequency multiplying circuit shown in FIG. 10.
Figure 11B:
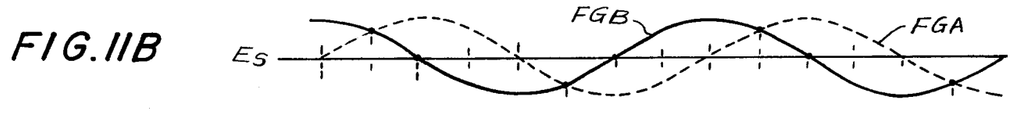

Here, input terminals 50A and 50B are coupled to the pickups 22A and 22B to receive the sinusoidal signals FGA and FGB, shown in solid lines in FIGS. 11A and 11B, respectively.

A voltage divider 51 includes series arrangement of a first resistor 52 coupled to a voltage source +B (e.g., 5 volts), a variable resistor 53, and another resistor 54 coupled to ground. A voltage dividing point at the junction of the resistors 53 and 54 provides a reference voltage E$_S$, whose level is indicated by the horizontal lines in FIGS. 11A and 11B. A subtractor or inverter 55 is supplied at a (−) terminal thereof with the signal FGB and at a (+) terminal thereof with the reference voltage E$_S$. This inverter 55 provides an inverted version $\overline{FGB}$ of the signal FGB, as shown in dash lines in FIG. 11A.

Four comparators 56 to 59 are disposed to provide switchover signals based on the relationship of the signals FGA, FGB, and $\overline{FGB}$, and the reference voltage E$_S$.

Figure 11C:
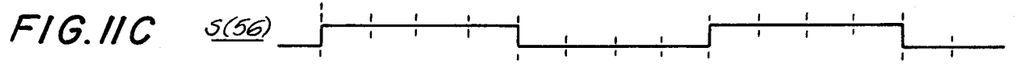

The comparator 56 has a (+) input coupled to receive the signal FGA, and (−) input coupled to receive the reference voltage E$_S$. Thus, this comparator 56 provides an output switching signal S(56) as shown in FIG. 11C.

Figure 11D:
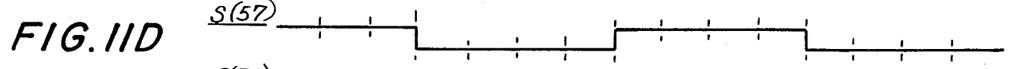

The comparator 57 has a (+) input coupled to receive the signal FGB, and a (−) input coupled to receive the reference voltage E$_S$. This comparator 57 provides an output switching signal S(57) as shown in FIG. 11D.

Figure 11E:
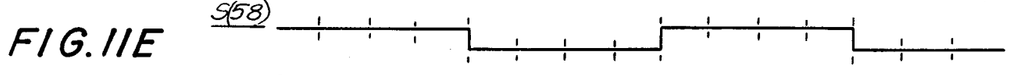

The comparator 58 has a (+) input coupled to receive the signal FGA and a (−) input coupled to receive the inverse signal $\overline{FGB}$. This comparator 58 provides an output switching signal S(58) as shown in FIG. 11E.

Figure 11F:
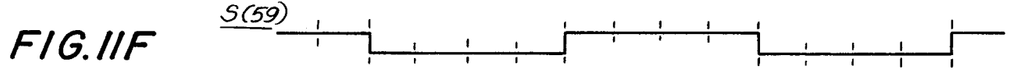

The comparator 59 has (+) and (−) inputs coupled to receive the signals FGA and FGB, respectively, and provides an output switching signal S(59) as shown in FIG. 11F.

Figure 11G:
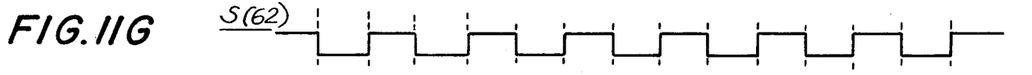
Figure 11H:
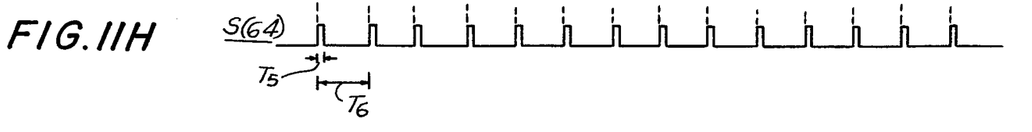

One exclusive OR gate 60 has inputs coupled to receive the signals S(56) and S(57), while a second exclusive OR gate 61 has inputs coupled to receive the signals S(58) and S(59). These exclusive OR gates 60 and 61 have outputs coupled to respective inputs of a third exclusive OR gate 62, which provides an output S(62) as shown in FIG. 11G. It should be appreciated that this signal S(62) is a square wave having eight transitions for each cycle of the sinusoidal signals FGA and FGB. This signal S(62) is applied to an inverting delay circuit 63 and is also applied to one input of another exclusive OR gate 64. The delay circuit 63 provides an inverted version of the signal S(62), delayed by a delay time T$_5$, to another input terminal of the exclusive OR gate 64. Consequently, an output signal S(64) (FIG. 11H) is applied from an output of the exclusive OR gate 64 to an output terminal 65. This signal S(64) is then applied to the terminal 30 of FIG. 8 as the frequency signal 8FG.

As the signal S(64) (i.e., the frequency signal 8FG) has a frequency eight times the frequency of the sinusoidal signals FGA and FGB, this signal S(64) will have a period T$_6$ equal to ⅛ of the period of the sinusoidal signals FGA and FGB, and will have a duration equal to the delay time T$_5$ of the delay circuit 63. In a practical embodiment, the duration T$_5$ can be selected as 25 msec. In the case of a two-hour tape, the period T$_6$ can, for example, be 0.69 msec and, in the case of a three-hour tape, the period T$_6$ can be 1.04 msec. Thus, the period of the resulting frequency signal 8FG corresponds to 1/48 of the period of the reproduced control signal CTL, or 1/32 of the period of the reproduced control signal CTL, when a two-hour tape or a three-hour tape is used, respectively. Consequently, even though the frequency generator 20 may employ a circular plate 21 having a smaller number of magnetic poles than the 180 poles of this embodiment, the frequency multiplying circuit 23 can generate a sufficiently high frequency signal, independent of the direction of rotation of the motor 1, so that any inaccuracies in tape movement owing, for example, to the torque ripple characteristic of the motor can be avoided.

Although this invention has been explained in the context of a video tape device, the invention can be practiced in a wide variety of environments where it is desired that a web be driven intermittently.

Moreover, while a single preferred embodiment has been described hereinabove, many modifications and variations thereof will become apparent to those of ordinary skill in the art, without departing from the scope and spirit of this invention, as defined in the appended claims.

What is claimed is:

1. A control circuit for a DC capstan motor for intermittently driving a tape in a tape device, comprising a frequency signal generator associated with said capstan motor for generating a frequency signal whose frequency varies with rotational speed of the motor; means generating a drive pulse signal for moving said tape intermittently; means generating a brake pulse signal alternating with said drive pulse signal for halting the intermittent movement of said tape; drive circuit means supplied with said frequency signal, said drive pulse signal, and said brake pulse signal for providing a pulse-width modulated (PWM) signal having a duty ratio that changes with the frequency of said frequency signal such that, during said drive pulse signal, said duty ratio decreases with increases in said rotational speed and, during said brake pulse signal, said duty ratio decreases with decreases in said rotational speed; and controller means supplied with said PWM signal for correspondingly supplying drive current to said DC motor for intermittently advancing said tape.

2. Control circuit according to claim 1, wherein said drive circuit means includes means providing a DC signal as said PWM signal during start up of said motor until the latter attains a predetermined rotational speed, and means providing a pulse signal whose pulse width decreases with increasing motor speed once said motor has attained said predetermined rotational speed.

3. Control circuit according to claim 2, wherein said drive circuit means includes a retrigger monostable multivibrator receiving said frequency signals as a succession of trigger impulses and an output supplying an output pulse signal having a time constant selectable between a first predetermined time and a second, longer predetermined time, and means for selecting said second time as said time constant during start up of said motor until said predetermined rotational speed is attained, and selecting said first time as said time constant when said predetermined rotational speed is attained.

4. Control circuit according to claim 3, wherein said means for selecting includes a logic gate having inputs supplied with said frequency signal and said output pulse signal and an output, and a flip flop having a set terminal supplied with a start signal, a reset terminal coupled to the output of said logic gate, and an output coupled to said retrigger monostable multivibrator to select the time constant of the output pulse signal.

5. Control circuit according to claim 3, wherein said retrigger monostable multivibrator also has an inverted output providing an inverted output pulse signal, and said means providing a pulse signal includes means for applying said inverted output pulse signal to said controller means when said motor has attained said predetermined rotational speed.

6. Control circuit according to claim 3, wherein said drive circuit means includes logic gate means having inputs connected to receive said brake pulse signal and said output pulse signal and an output supplying said output pulse signal to said controller means as said PWM signal during braking of said motor.

7. Control circuit according to claim 1, wherein said means generating a brake pulse signal includes a monostable multivibrator having a trigger input and an output, and means coupled to said trigger input receiving a brake start signal to trigger said monostable multivibrator, said output providing said brake pulse having a duration selected to be sufficient to brake said motor without causing it to rotate in a reverse direction.

8. Control circuit according to claim 1, wherein said drive circuit means includes pulse generating means having first and second outputs, said first output producing a first output pulse signal having a duty ratio which increases with increases in said rotational speed and said second output producing a second output pulse signal having a duty ratio which decreases with increases in said rotational speed, and selecting means for selecting said first output pulse signal as said pulse-width modulated signal during said brake pulse signal and for selecting said second output pulse signal as said pulse-width modulated signal during said drive pulse signal.

9. Control circuit according to claim 8, wherein said pulse generating means produces said first output pulse signal with a first time constant and said second output pulse signal with a second, different time constant.

10. Control circuit according to claim 8, wherein said drive circuit means further includes override means for providing said pulse-width modulated signal with a duty ratio of one during said brake pulse signal when said rotational speed is greater than a first predetermined value.

11. Control circuit to claim 10, wherein said drive circuit means further includes second override means for providing said pulse-width modulated signal with a duty ratio of one during said drive pulse signal when said rotational speed is less than a second predetermined value.

12. Control circuit according to claim 8, wherein said pulse generating means comprises a retrigger monostable multivibrator.

13. Control circuit according to claim 12, wherein said first output is an uninverted output and said second output is an inverted output.

14. Control circuit according to claim 13, including timing means selectably connectable to said multivibrator, said multivibrator having a first time constant when said timing means is not connected and a second time constant when said timing means is connected, said timing means being connected to said multivibrator only when said selecting means selects said second output.

* * * * *